United States Patent
Birdsong et al.

(10) Patent No.: US 6,290,596 B1
(45) Date of Patent: *Sep. 18, 2001

(54) AIR DIFFUSER, AND MOLD AND METHOD FOR ITS PRODUCTION

(75) Inventors: John R. Birdsong, Allen; Kennon B. Porter, Bonham, both of TX (US)

(73) Assignee: Tomkins Industries, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/376,128

(22) Filed: Aug. 17, 1999

Related U.S. Application Data (63) Continuation of application No. 08/899,345, filed on Jul. 23, 1997, now Pat. No. 5,938,525.

(51) Int. Cl.$^7$ ............................................. F24F 13/068
(52) U.S. Cl. .......................... 454/289; 454/290; 454/308
(58) Field of Search ................................... 454/289, 290, 454/308, 324, 334

(56) References Cited

U.S. PATENT DOCUMENTS

| | | | |
|---|---|---|---|
| 2,381,345 | * | 8/1945 | Greenlaw ............................ 454/308 |
| 2,505,394 | * | 4/1950 | Goettl .................................. 454/308 |
| 3,837,612 | * | 9/1974 | Deters . |
| 4,145,961 | | 3/1979 | Lolli . |
| 4,259,898 | | 4/1981 | Finkelstein et al. . |
| 4,291,615 | * | 9/1981 | Sodec . |
| 4,303,007 | | 12/1981 | Riegel et al. . |
| 4,449,549 | * | 5/1984 | Weck . |
| 4,508,022 | | 4/1985 | Finkelstein et al. . |
| 4,523,609 | * | 6/1985 | Weck . |
| 4,549,474 | | 10/1985 | Fey et al. . |
| 4,890,544 | | 1/1990 | Aalto et al. . |
| 4,903,894 | | 2/1990 | Pellinen et al. . |
| 4,934,397 | | 6/1990 | Niemelä et al. . |
| 5,014,609 | | 5/1991 | Weck . |
| 5,016,525 | | 5/1991 | Weck . |
| 5,054,379 | * | 10/1991 | Sodec . |
| 5,058,490 | * | 10/1991 | Sodec et al. . |
| 5,063,834 | | 11/1991 | Aalto et al. . |
| 5,069,114 | * | 12/1991 | Sodec et al. . |
| 5,074,198 | | 12/1991 | Aalto et al. . |
| 5,116,197 | | 5/1992 | Snell . |
| 5,133,689 | | 7/1992 | Aalto et al. . |
| 5,146,764 | | 9/1992 | Bauman et al. . |
| 5,180,331 | * | 1/1993 | Daw et al. ........................ 454/290 X |
| 5,220,910 | | 6/1993 | Aalto et al. . |
| 5,312,296 | | 5/1994 | Aalto et al. . |
| 5,556,330 | * | 9/1996 | Schweikert ............................ 454/289 |

FOREIGN PATENT DOCUMENTS 2-136644 * 5/1990 (JP) ...................................... 454/289

OTHER PUBLICATIONS

Krantz, Underfloor Air Supply System, Technical Manual (Jan. 14, 1991).*
Floor Diffusers, Type FB in aluminum and plastic, Gebr. Trox GmbH (1991).*

* cited by examiner

*Primary Examiner*—Harold Joyce
(74) *Attorney, Agent, or Firm*—Calfee, Halter & Griswold, LLP (57) ABSTRACT

An air diffuser for underfloor air and electrical distribution systems, which can be rapidly converted to a cable grommet assembly, is provided with a diffuser grille having generally helical slots that produce a swirling air flow pattern with low impulse, low turbulence and high induction of room air. The helical air slots allow the grille to be rotated or spun off a mold, which allows the grilles to be molded more rapidly and economically. The grille sits on a housing which contains a flow regulator. Both the housing and the flow regulator have side walls with air slots. The regulator is connected to the grille and can be rotated by rotating the grille to regulate that air flow through the diffuser. The air diffusers and cable grommet assemblies are supported by common mounting systems that can be installed through the floors overlying an air distribution and/or electrical cable plenum. The mounting system includes a trim ring installed in a hole in the floor, which supports the other components of the air diffuser or grommet assembly, and a retaining ring which is dropped through the hole before the trim ring is installed and then ratcheted onto the trim ring.

13 Claims, 13 Drawing Sheets

AIR DIFFUSER, AND MOLD AND METHOD FOR ITS PRODUCTION

RELATED APPLICATIONS

This is continuation of application Ser. No. 08/899,345, filed on Jul. 23, 1997 U.S. Pat. No. 5,938,525.

FIELD OF THE INVENTION

The invention relates to an air diffuser designed for underfloor air distribution systems, and to a mold and method for making the diffuser. The diffuser is mounted, with a specially designed mounting system, in the floor that separates the plenum of the air distribution system from the room or other enclosure to be heated, cooled or ventilated.

BACKGROUND

Underfloor air distribution has gained popularity in work environments due to its design flexibility and reconfiguration capabilities. While early underfloor air distribution systems were designed for spaces housing large computer systems, the increased use of local area networks and telecommunication systems are requiring entire buildings to be designed with underfloor air distribution systems that provide large quantities of cooling air. Also, with the trend to more frequent office reorganization, flexible offices with electrical and mechanical systems that can be easily reconfigured at minimum cost to accommodate personnel and hardware requirements are in increased demand.

Bottom source or underfloor air distribution systems typically include a number of small diffusers that can be moved to accommodate frequent changes in space usage and the resulting changes in ventilation requirements. The diffusers are typically mounted in a raised floor that defines the top surface of a plenum chamber. In other words, the space beneath the floor panels constitutes an enclosed plenum chamber or air space in which the air pressure is greater than in the room or other enclosure to be heated, cooled or ventilated. Air flows from the plenum chamber through the diffusers into the room or other enclosure. For optimal performance, diffusers should expel air in a swirling air pattern with little or no turbulence and, to prevent drafts, relatively low jet velocities. This pattern promotes high induction or entrainment rates that mix unconditioned air within the room with the air being supplied through the diffusers, thereby providing comfortable air movement and eliminating or reducing air stagnation and stuffiness.

One known underfloor air distribution system, produced by Krantz, is an injection molded device consisting of a diffuser grille, a damper, a basket, a trim frame and a retaining frame. The damper is placed within the basket, and the diffuser is placed on top of the basket. The basket is inserted into the trim frame, which is inserted into the retaining frame. The retaining frame, in turn, can be affixed to flooring panels for access to the underfloor air plenum supply. The grille is designed with a circular configuration and has air slots which extend radially from the center of the grille to the outside edge of the grille. The slots can vary in length and width, but have a uniform slope.

Typical underfloor air distribution systems, such as those produced by Krantz, are difficult to manufacture due to the intricate nature of the grilles. Currently, grilles manufactured from a composite material are produced in injection-type molds with retractable core pins that form the intricate pattern of slots in the grille. After molding, each core pin must be retracted from the grille so that the grille can be removed from the mold. This adds a significant increment of time, perhaps 50 to 100%, to the time that would be required to produce the grille if it could be produced on a solid mold with fixed core pins. The retractable core pins also multiply the costs to produce and maintain the equipment. The costs for molds for previous diffuser grilles, with retractable core pins, has been estimated to be at least $500,000, whereas a solid mold for producing the same grille, if this could be done, might cost less than $100,000. The retractable core pins also increase the maintenance costs substantially. With all off these costs and disadvantages, molds with retractable core pins would normally be considered cost prohibitive for this type of diffuser. Thus, to reduce equipment cost, manufacturing time and the costs of the molded grilles, there is a need for grille designs, and production equipment and methods, whereby the grille is readily and easily removed from a solid mold with fixed core pins.

SUMMARY OF THE INVENTION

The present invention provides a diffuser for underfloor air distribution with a grille having generally helical slots with substantially straight sides along arcuate sections through said slots. These slots produce a swirling air flow pattern with high induction. Unlike previous diffusers for this type of flow pattern, however, the helical air slots of this invention allow the grille to be rotated or spun off a solid mold core. The ability to quickly remove the grille from the mold core is a dramatic improvement over current manufacturing techniques in which each individual mold insertion must be separately retracted from the respective air slot in order to remove the grille. Since the grille of this invention can be produced with a solid mold, the costs of the mold and molding time are both significantly lower than with prior art molds with retractable core pins.

In the preferred embodiment, the diffuser grille sets on a dust receptacle or basket-shaped housing that is supported by a mounting assembly in the floor. A flow regulator or damper nests inside the housing. Both the housing and the flow regulator have vertically extending air slots extending through their side walls. Air from the underfloor air plenum passes through these slots into the diffuser and is forced through the helical slots in the grille into the room above the diffuser. The air flow rate can be adjusted by rotating the flow regulator within the housing so that the slots in the flow regulator are either in or out of registry with the slots in the housing.

The preferred grille for this diffuser rests on top of the rim of the housing, and the flow regulator has a series of pins that project into grille slots. The rim of the housing and the outer surface of the grille have mating rings of shallow, generally V-shaped teeth. The slopes of the sides of these teeth are designed to allow the grille to be rotated, thereby adjusting the air flow rate, with gentle manual pressure. The grilles will not rotate, however, if a heavier weight such as a person or a piece of furniture is on the diffuser.

The invention also provides a mounting system for securing the diffusers in floors above underfloor air distribution systems. The mounting system includes a trim ring that extends through a hole in the floor and a retaining ring. The trim ring has a rim that rests on the floor. The retainer ring is shaped so that it can be dropped through the hole in the floor and then pulled up onto the trim ring, with the floor gripped between the retaining ring and the rim of the trim ring. The preferred retainer ring is movably fixed to the trim ring by a ratchet-like latching mechanism that allows the retainer ring to be rotated about and onto the trim ring. This accommodates various thicknesses of flooring panels. Once the trim ring is properly positioned, the retainer ring is ratcheted onto the trim ring to securely attach the diffuser to the floor.

The diffuser can be rapidly converted to an electrical power/data port by removing the grille, flow regulator and housing, and replacing them with a power/data port cover with one or more openings for electrical cables. The power/data port cover is supported by the trim ring that also supports the housing, flow regulator and grille of the air diffuser. This further improves the flexibility of the system by allowing a fixture that had been an air diffuser to be quickly converted into an electrical power/data port, or vice versa. Other features and advantages of this invention will be apparent from the following description.

DETAILED DESCRIPTION

Figure 1:
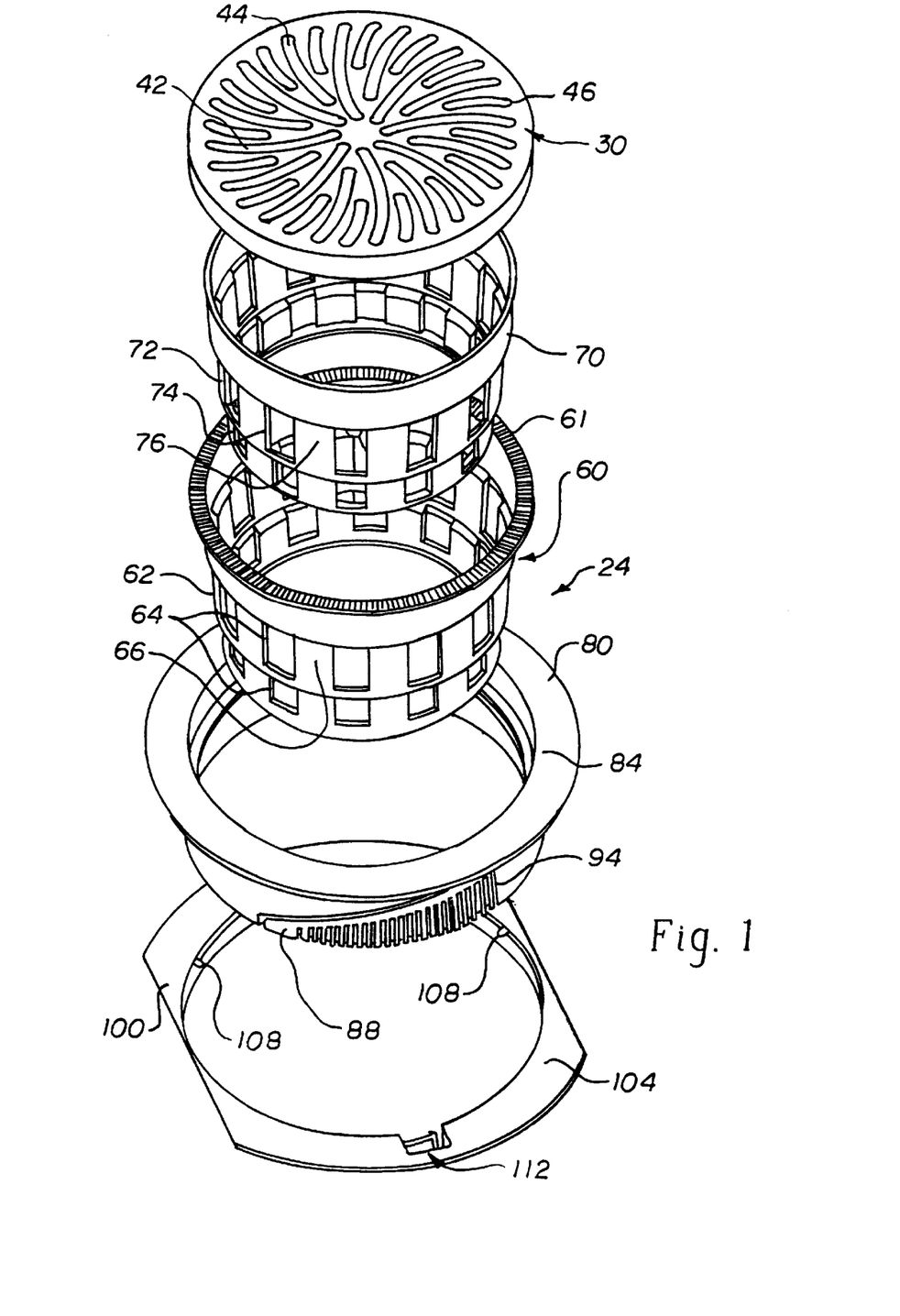
FIG. 1 is an exploded perspective view of an underfloor air diffuser embodying this invention.

FIG. 1 is an exploded perspective view of an underfloor air diffuser embodying this invention. The diffuser, referred to generally as 24, has a grille 30 supported by a dust receptacle or basket shaped housing 60. As show in FIG. 2, housing 60 is mounted in the floor 25 above the plenum 28 of the air distribution system by a trim ring 80 and a retaining ring 100, described in more detail below. In the preferred diffuser 24, a flow regulator or damper 70 nests inside the basket-shaped housing 60. The side walls 72 of flow regulator 70 and the side walls 62 of housing 60 are complementary surfaces of revolution, such as stepped, slightly tapered cylinders or truncated cones, that allow the side walls 72 of the flow regulator to contact and rotated with respect to the side walls 62 of the housing. The illustrated flow regulator 70 has an upper sloping shoulder 75 and a lower sloping shoulder 77 that rest on sloping shoulders 65 and 67 in housing 60. The upper and lower pairs of sloping shoulders 75, 65 and 77, 67 providing mating surfaces that reduce surface contact and allow the flow regulator to rotate easily within the housing.

The side walls 62 of housing 60 and the side walls 72 of flow regulator 70 have mating longitudinally extending air slots 64, 74, separated by solid portions 66, 76 of their respective side walls 62, 72. When the flow regulator is rotated so that the slots 74 in the flow regulator are in registry with the slots 64 in housing 60, air can flow from the underfloor air plenum 28 into the diffuser. This flow can be reduced or stopped by rotating the flow regulator 70 so that solid portions 76 of the flow regulator side walls 72 partially or totally cover the air slots 64 in the housing.

Vertical tabs or pins 78 protrude from the upper rim 79 of air flow regulator 70, extending above the top of housing 60 into air slots 42, 44 or 46 in the grille 30. The pins 78 are spaced to correspond to the spacing of the slots in the grille, so that each pin will engage one of the air slots whenever the grille is placed on the housing 60 and flow regulator 70. When the grille is rotated, an inner wall of an air slot engages each of the pins, and the flow regulator is rotated with the grille. As the flow regulator rotates within housing 60, the air slots 74 in the side walls of the flow regulator and the solid portions 76 of the flow regulator side walls open and close the air slots 64 in the side walls of the housing. Thus, the air flow from the plenum through the diffuser can be controlled by simply rotating the grille by hand.

Figure 3:
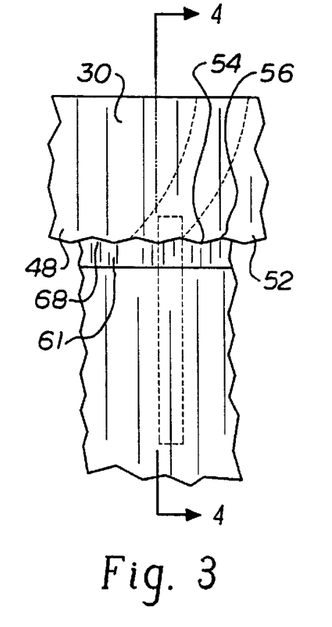
FIG. 3 is an enlarged detail view, along lines 3—3 of FIG. 4, of the rims of the grille and the housing on which it rests, showing the teeth between the grille and housing.
Figure 6:
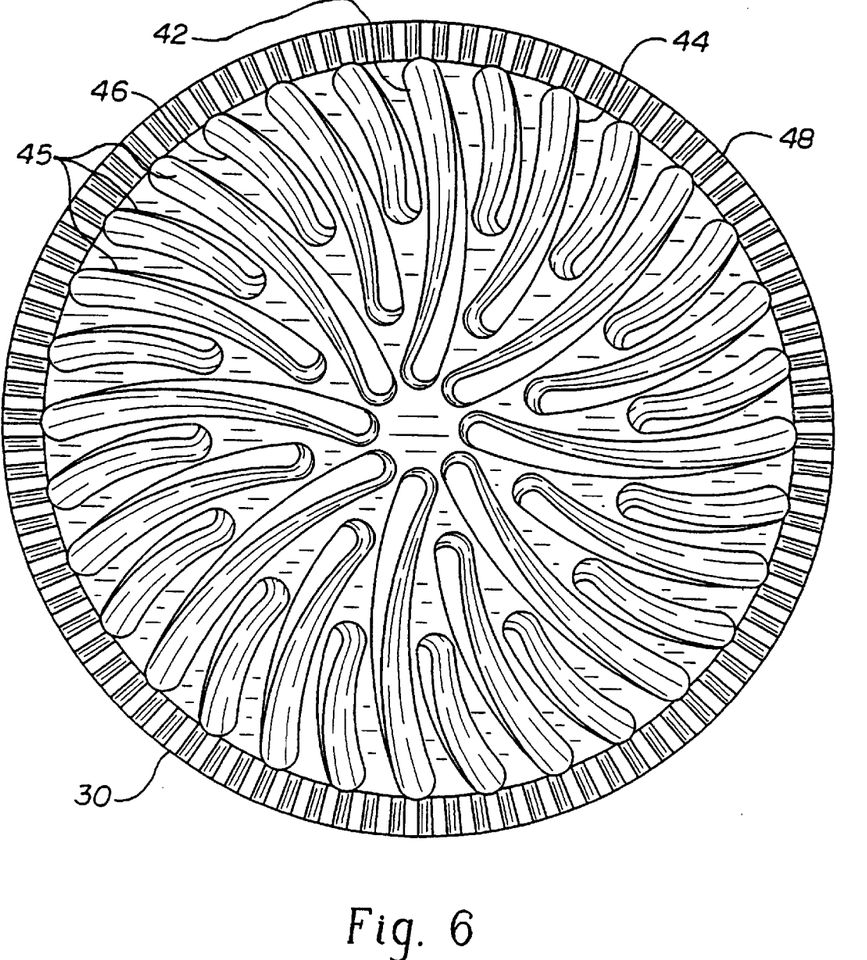

As may be seen in FIGS. 3 and 6, there is a ring of shallow, V-shaped teeth 48 around the outer edge of the bottom of grille 30. There is a mating ring of teeth 68, shown in FIGS. 1 and 3, around a flange 61 that extends laterally from the top of housing 60. Grille 30 rests on flange 61, and the teeth 48 on the bottom of the grille mesh with the teeth 68 on the top of the flange. The sides 52 of the illustrated teeth 48, 68 define angles of about 150° at the tips 54 and bases 56 of the teeth 48, 68. This shallow angle allows the grille to be rotated with gentle pressure on the top of the grille, thereby rotating flow regulator 70 and opening or closing the air slots 64 in housing 60. Thus, the flow rate can be adjusted quickly without removing the grille. However, when a greater force such as the weight of a piece of furniture or a person is placed on the grille, the teeth 48, 68 lock the grille and prevent inadvertent movement.

Air is discharged from the diffuser through slots 42, 44, and 46 in grille 30. Unlike conventional grilles for this type of underfloor diffuser which, because of manufacturing limitations, have generally had straight slots, the grilles of this invention have a pattern of curved, helical slots with substantially straight side along arcuate sections through said slots. These slots extent generally inwardly from near the outer rim of the grille 30, with the longest slots 42 terminating at the central hub 36 of the grille. These long slots 42 are separated from each other by medium length slots 44 and short slots 46. This pattern facilitates production of a grille with slots comprising a relatively high percentage of its face, while maintaining desired structural integrity. When constructed of an engineered plastic, the illustrated grille, with slots covering more than 20% of the surface of the grille, is capable of supporting loads in excess of 1400 lbs., which makes it entirely suitable for underfloor air diffusers.

The slots in the grille are sloped so that the sides 45 of the slots function as air deflectors that help provide the desired flow pattern. The curvature and slope of the slots provide a swirling air flow with low jet velocities, low impulse, minimal turbulence, and high induction. As shown in FIGS. 7–13, the slots are produced in an injection mold with a mold core 140 with an intricate pattern of core pins 142, 144, 146, extending from a base 141. The mold also has a cap 132 (shown in FIG. 8) with a cylindrical cavity that defines the general shape of the grille.

Figure 8:
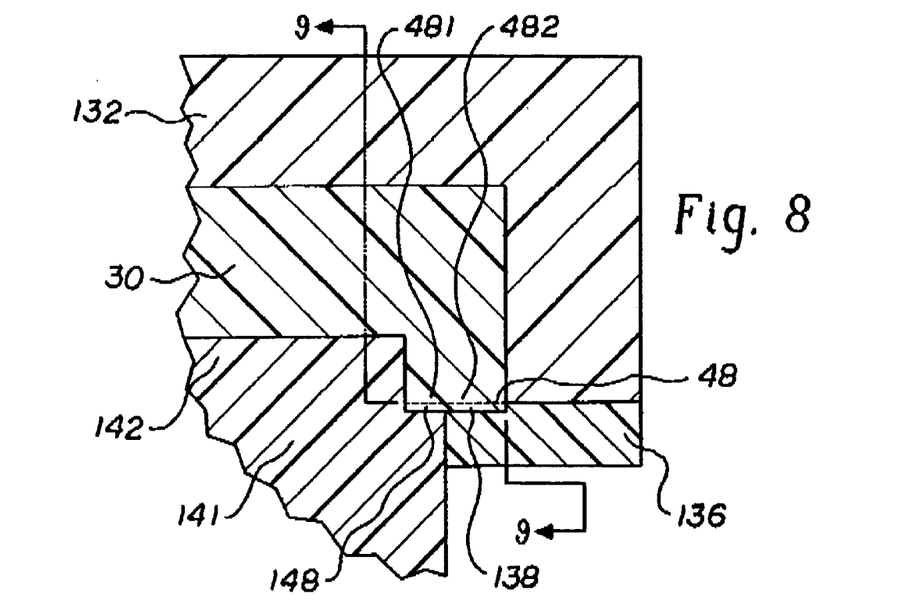
FIG. 8 is a fragmentary cross-sectional view of the grille, the mold core, the mating collar ring and the mold cap that defines the basic shape of the grille in the molding process, along lines 8—8 in FIG. 9.

Molten resin is injected into the mold around the core pins, which form the slots 42, 44, 46 in the grille. As best seen in FIG. 8, the base 141 of the mold core also has an outer ring of teeth 148 that form the inner portions 481 of the teeth 48 around the outside of the bottom of grille 30. The outer portions 482 of the teeth 48 on the grille are formed by a mating collar ring 136 with a ring of teeth 138 that are aligned with the teeth 148 on the base 141 of mold core 140.

Figure 7:
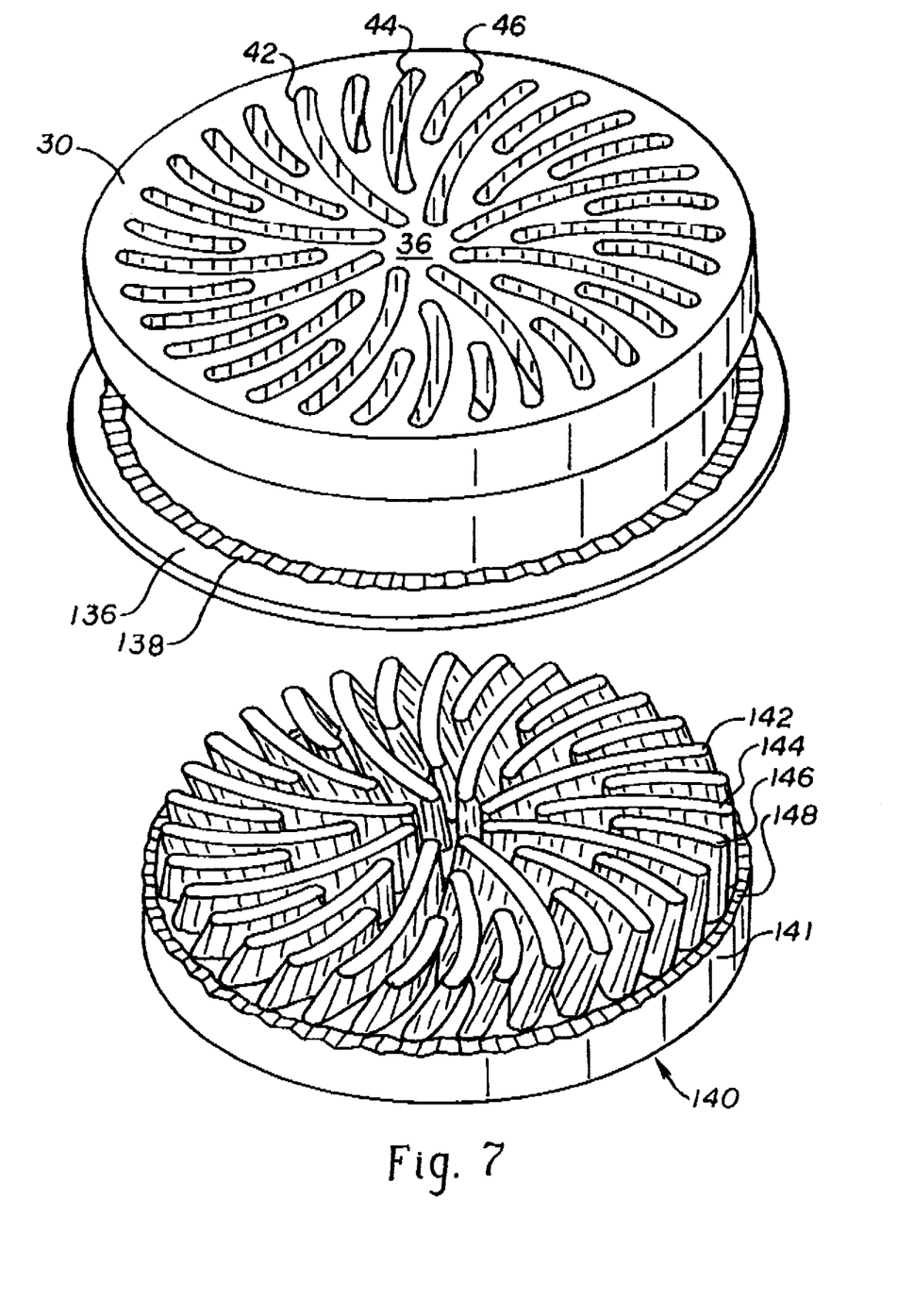
FIG. 7 is an exploded perspective view of the grille, the mold core on which it is produced, and a mating collar ring used to remove the grille from the mold core.

Upon completion of the molding process, lid 132 is removed and the molded grille 30 is rotated and extracted from the mold core 140 by lifting and rotating the mating collar ring 136, which is shown in FIG. 7. The teeth 138 on the collar ring, engaged with the teeth 48 on the bottom of the grille, ensure that the grille rotates with the collar ring at the desired rate. The rotation of the mating collar ring is coordinated with its vertical movement so that the arcuate movement of the grille corresponds to the slope of the slots. This allows the grille to be rotated or "spun" off the fixed core pins 142, 144, 146 of the mold core 140. Ejector pins (not shown) in the base 141 of the core also contribute to the extraction of the grille.

Core pins 142, 144 and 146 are preferably formed by electrostatic discharge machining. A carbon electrode which corresponds to the slots in the grille machines material from a block of tool steel by electrostatic discharge to form the pins. This process produces a mold core that, in comparison to other molding processes used to form similar geometry, such as molds with retractable core pins, is much less expensive in original fabrication of the mold, in maintenance requirements, and in operating costs.

In the illustrated mold core and grille, the left side of each core pin defines an acute angle with the top of the mold that varies from about 27° to about 5° along the length of the core pin and along the length of the corresponding grille slot. The right hand side of the illustrated core pins 142, 144, 146 and grille slots 42, 44 and 46 meet the mold top or grille face at obtuse angles ranging from about 147° to about 101°. The difference between the angles on the two sides of the core pins and slots provides a draft angle of about 3° (per side), which might be between about 3° and about 5° in other embodiments. This facilitates removal of the grille from the mold.

Figure 9:
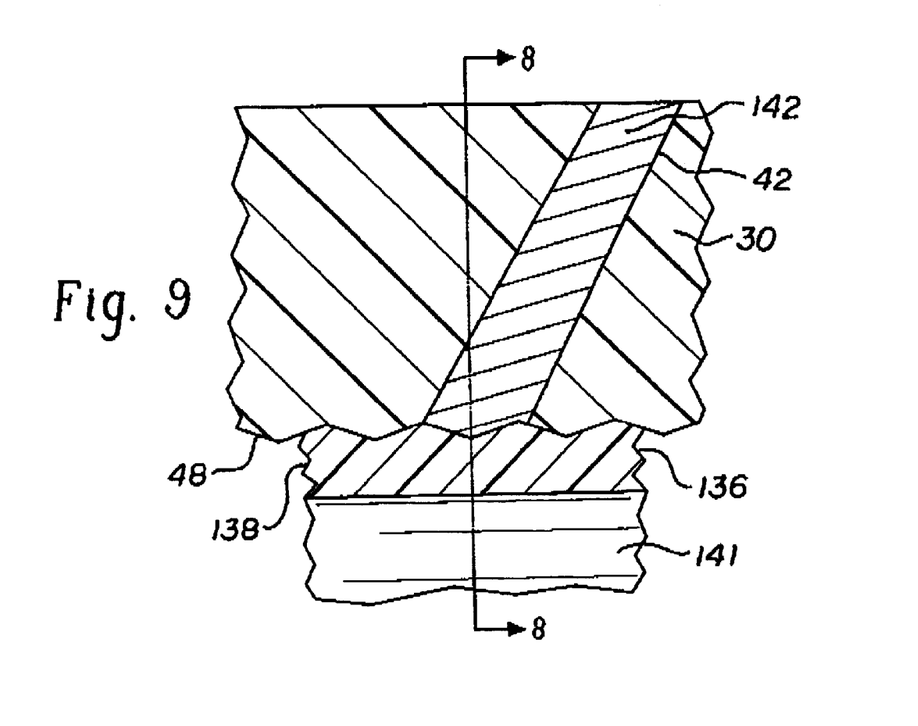
FIG. 9 is a fragmentary cross-sectional view along lines 9—9 in FIG. 8.
Figure 10:
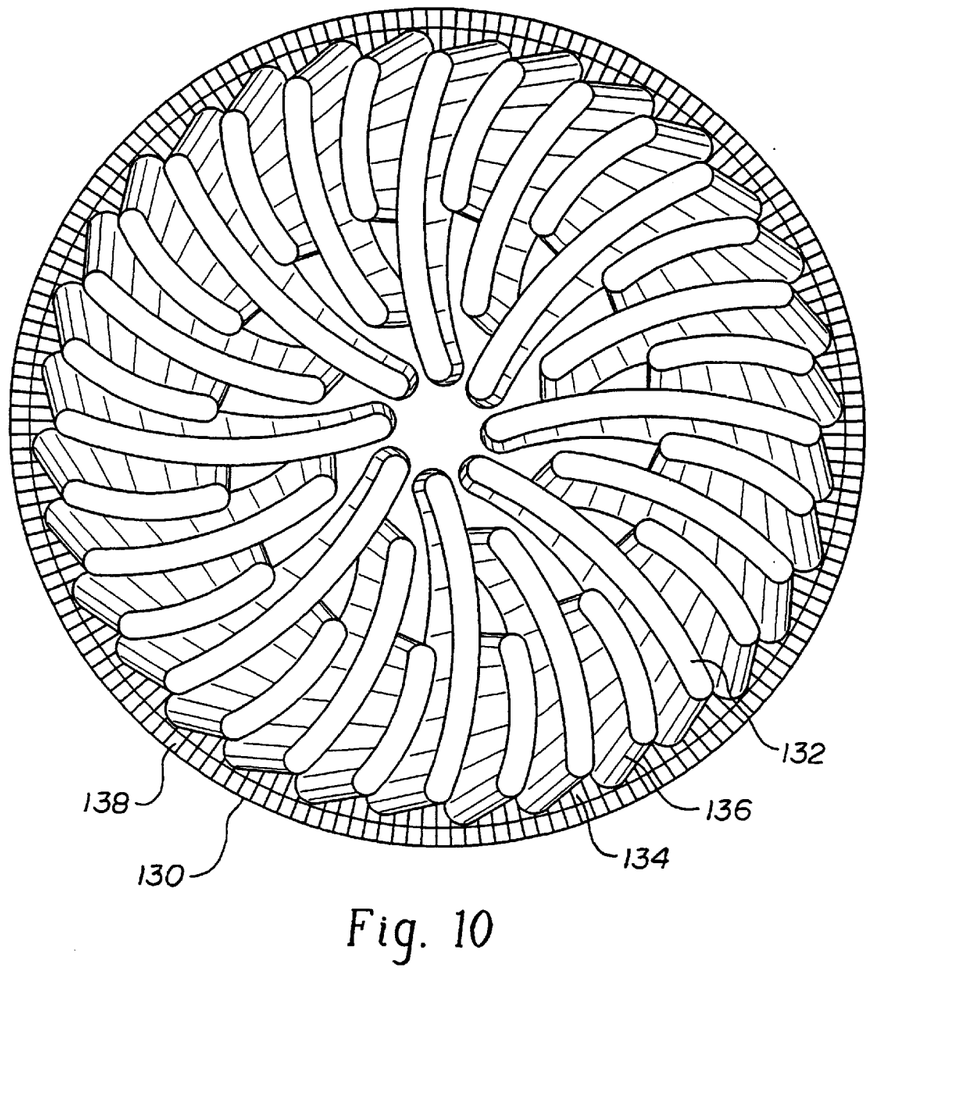
FIG. 10 is a top plan view of the mold core.
Figure 11:
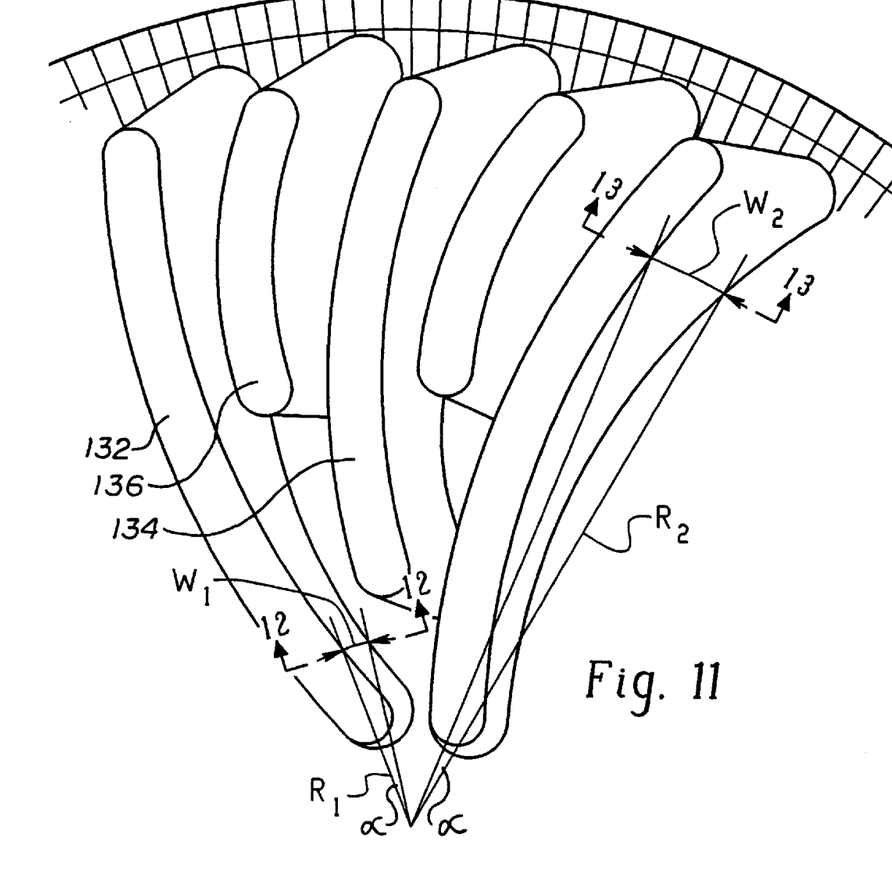
FIG. 11 is an enlarged plan view of a fragment of the mold in FIG. 10, showing the geometrical configuration of the core pins.
Figure 12:
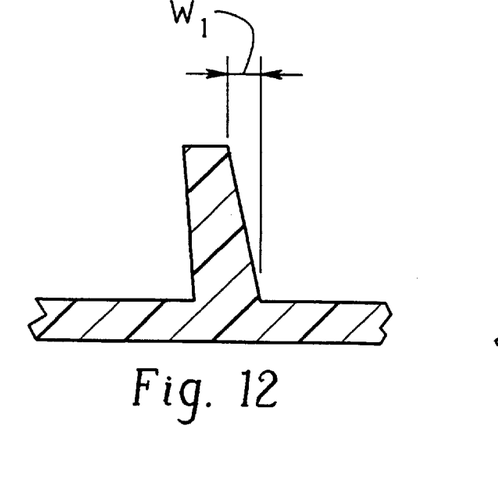
FIGS. 12 and 13 are enlarged cross-sectional views along lines 12—12 and 13—13 in FIG. 11.
Figure 13:
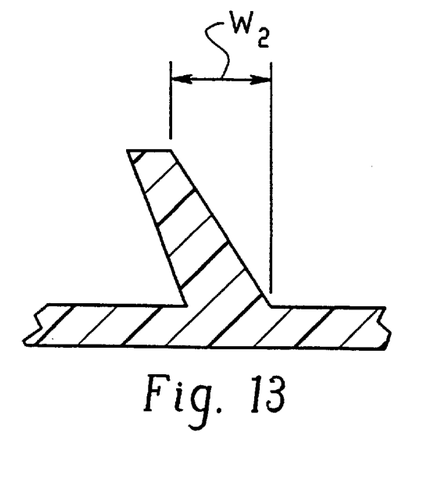
Figure 14:
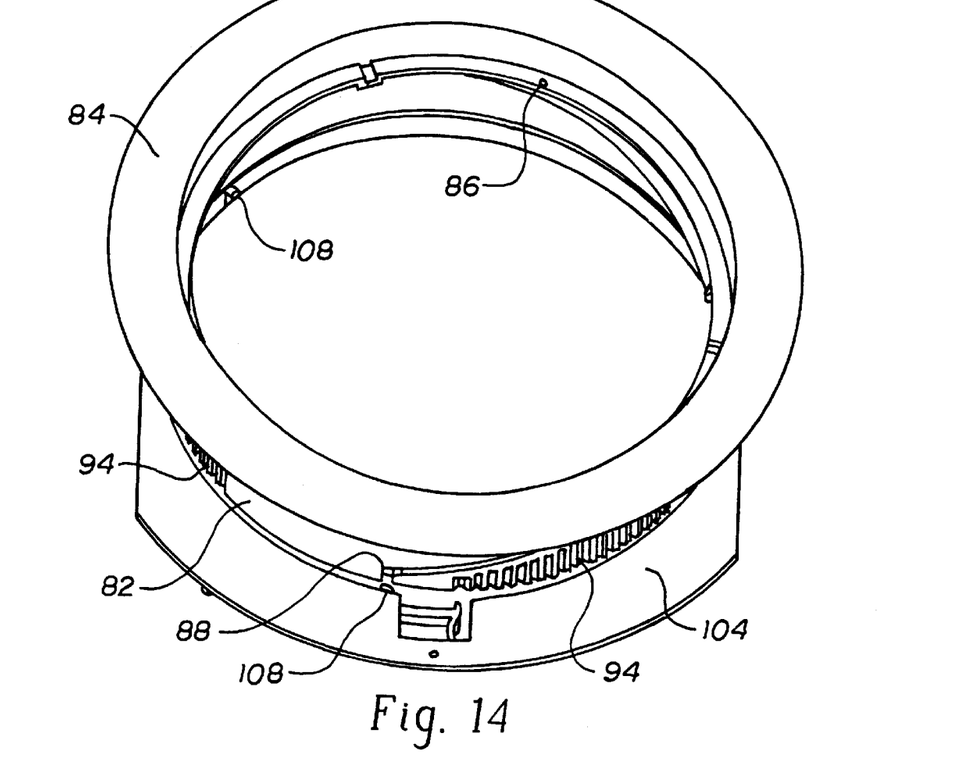
FIG. 14 is a perspective view of the trim ring and retaining ring in FIG. 1, illustrating the ratcheting mechanism that holds them together, so that the diffuser is secured in a hole in a floor panel as shown in FIG. 2, yet allows them to be separated so that the diffuser can be moved.

As shown in FIGS. 9–11, each slot and core pin of the illustrated grille and mold core is designed so that the lateral offset from a point along the top edge of any slot or core pin to the bottom edge of the same side of the slot or core pin at the same radial distance from the center of the grille or mold core or, in other words, the width of the base of a right triangle lying substantially in an arcuate section through the points, with the right corner of the triangle directly beneath the point on the top edge, is a function of the distance from the center. As seen in FIGS. 10 and 11, the width W, of a base of a right triangle formed by a first arcuate section extending through any slot or pin and the width $W_2$ of a base of a right triangle formed by a second arcuate section extending through the slot or core pin at another point or through another slot or pin satisfy the equation $$W_1/W_2 \cong R_1/R_2$$

where $R_1$ and $R_2$ equal the distance from a center point of the grille to the first and second arcuate sections. As a result, an angle formed between a first radial line intersecting the top of a slot or core pin and a second radial line through a projection of the bottom of the slot or core pin is substantially equivalent to the angle between two comparable projections at the top and bottom of the slot at any other point.

As a result of the unique shape of these helical core pins 142, 144, 146 and helical grille slots 42, 44 and 46, the finished grille can be simply rotated or "spun" off the mold when the molding process is finished. This is a radical departure from previous molding processes for grilles for this type of diffuser, which employed complicated, cumbersome and expensive molding equipment and techniques with individual retractable mold core pins for each slot. These core pins had to be retracted individually at the end of the molding process before the grille could be removed from the mold. The simplicity of the mold and process of this invention, in which the grille is simply rotated off a substantially less expensive solid mold core, thereby shortening the molding process significantly to provide even greater savings, is in stark contrast to the complexity and inefficiency of the prior art equipment and practices.

Figure 2:
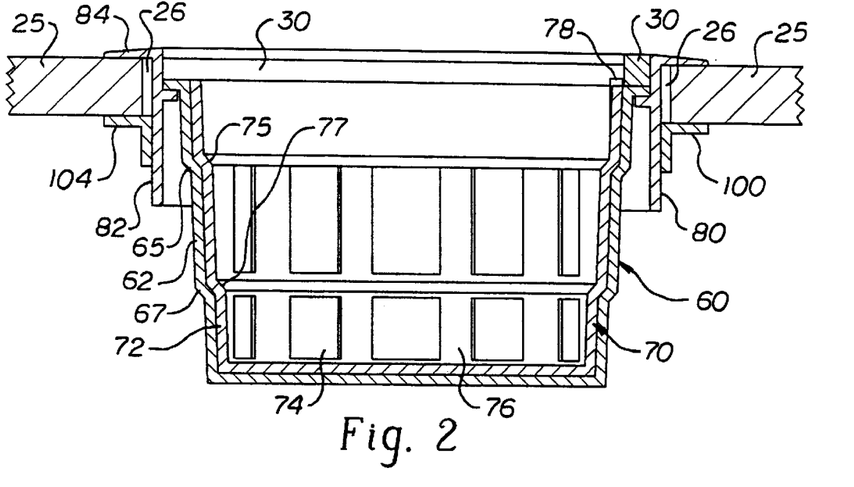
FIG. 2 is a partially sectioned elevation view of the diffuser in FIG. 1, installed in the floor panel of an underfloor air distribution system.

As shown in FIG. 2, the diffuser 20 is designed to be mounted, with the trim ring 80 and retaining ring 100 illustrated in FIGS. 14–19, in a hole 26 in the floor 25 above an air distribution plenum 28. The trim ring and retaining ring are designed so that the entire installation process can be performed from above the floor, which shortens installation and relocation of the diffusers substantially. This diffuser can be installed in less than 1 minute, whereas installation of prior art diffusers that required parts of the installation to be performed from beneath the floor typically required at least 5 minutes. In an office building with many diffusers, the time savings are significant.

Referring to FIGS. 2 and 14–17, trim ring 80 has a cylindrical section 82 that extends through the hole 26 in the floor, and a tapered flange 84, extending laterally from the top of cylindrical section 82, that is larger than the hole in the floor. The surface of the cylindrical section 82 of the trim ring has three series of latching teeth 94 and three camming grooves 88 that hold the trim ring and retaining ring together in the installed position. Retaining ring 100 has a cylindrical section 102 whose inner diameter is slightly larger than the outer diameter of the cylindrical section 82 of the trim ring.

A flange 104 extends from the upper end of the cylindrical section 102 of the retaining ring and, as seen in FIG. 2, presses against the bottom of floor 25 in the installed position. Flange 104 differs from the flange 84 on the trim ring in that it does not have a uniform diameter or width. In one direction flange 104 is longer than the width of the hole 26 in which it is to be installed. Thus, the flange spans the hole and holds the diffuser in place. In another direction, as best seen FIG. 17, the width of flange 104 is only slightly greater than the outer diameter of the cylindrical section 102 of the retaining ring, and less than the width of hole 26. This means that the retaining ring can be slipped through the hole in the installation process, and the entire process can be performed from above the floor.

Figure 20A:
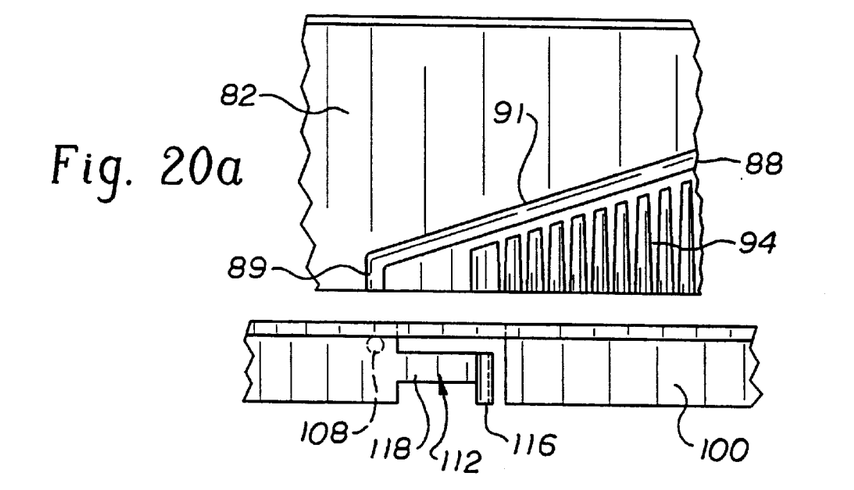
FIGS. 20a, 20b and 20c are fragmentary side elevation views of the trim ring and retaining ring, illustrating the assembly of these components.
Figure 20B:
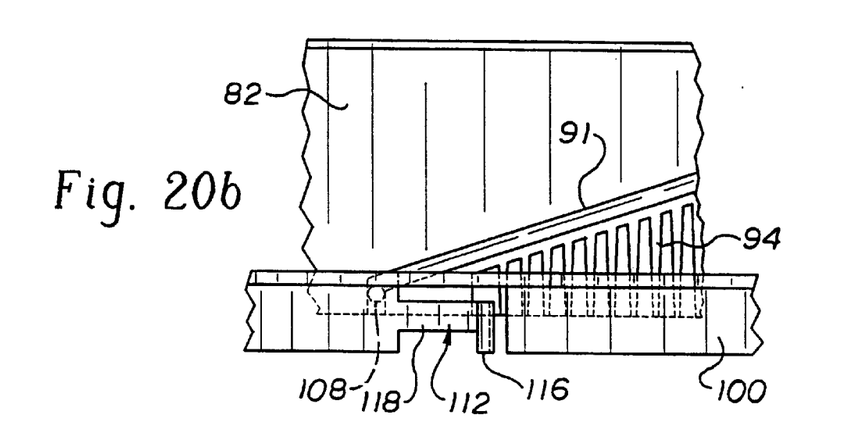
Figure 20C:
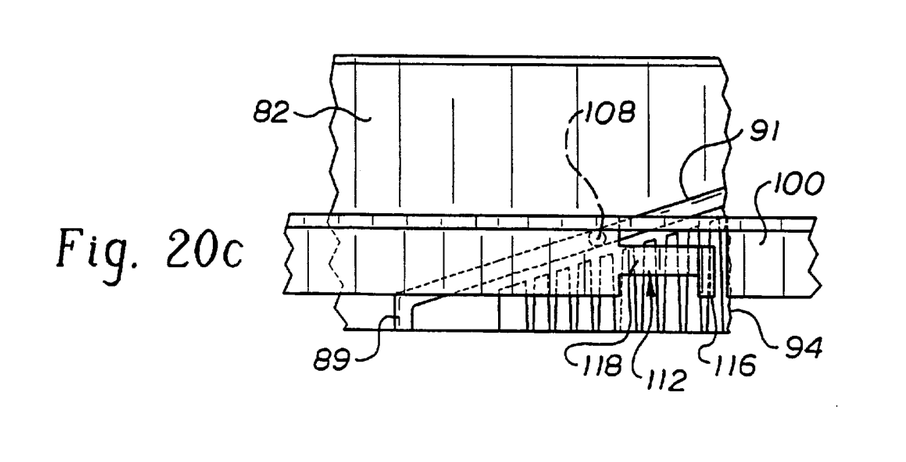

Three pins 108, which may be seen in FIGS. 14, 16–18, 20a, 20b, and 20c, extend from the inner surface of retaining ring 100. As best seen in FIGS. 20a, 20b, and 20c, these pins 108 are positioned to enter vertically extending mouths 89 of the camming grooves 88 on the trim ring when the retaining ring is placed on the bottom of the trim ring. When the pins reach the top of the vertically extending mouths of the camming grooves, the retaining ring may be rotated with respect to the trim ring and the pins 108 ride up inclined spiral sections 91 of camming grooves 88, pulling the retaining ring onto the trim ring until it reaches the installed position shown in FIG. 2.

Retaining ring 100 has a latching mechanism 112 that engages one of the series of latching teeth 94 on the trim ring. Latching mechanism 112 comprises a latch tooth 114 that engages the teeth 94 on the trim ring, a release tab 116 used to disengage the latch tooth 114 from teeth 94, and a resilient arm 118, extending from the cylindrical section 102 of the retaining ring, on which the latch tooth and release tab are mounted. There is an opening in the retaining ring flange 104 at the latching mechanism to facilitate access.

Figures 18, 19:
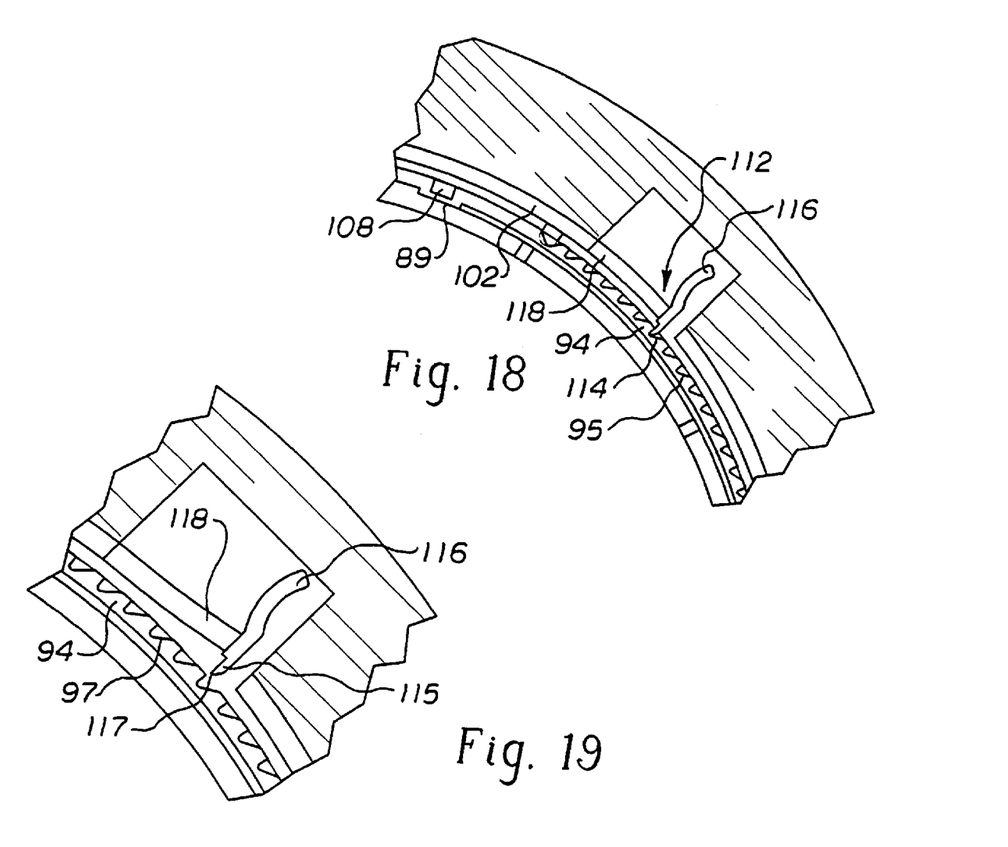
FIG. 18 is an enlarged detail view of the ratcheting mechanism in FIGS. 14 and 16.
FIG. 19 is a still further enlarged detail view of the ratcheting mechanism, showing how the locking tooth is moved for removal of the retaining ring.

As the retaining ring is rotated onto the trim ring, the latch tooth engages the teeth on the trim ring and locks the retaining ring in place. As best seen in FIGS. 18 and 19, the leading sides 95 of the trim ring teeth 94, i.e. the sides that are contacted first by the latch tooth 114 as the retaining ring rotates onto the trim ring, and the leading side 115 of latch tooth 114, are sloped or beveled to allow the latch tooth to pass over the trim ring teeth in the installation process. The trailing sides 97 of the trim ring teeth and the trailing side 117 of the latch tooth are substantially at right angles to the direction of movement of the latch tooth to reduce the risks of inadvertent release.

Figure 4:
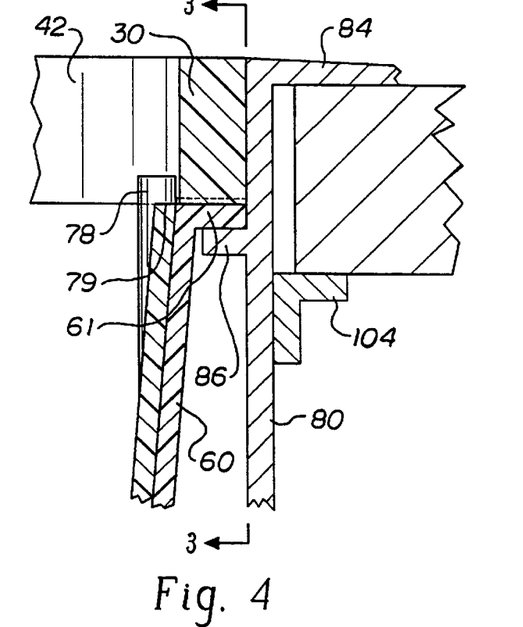
FIG. 4 is an enlarged cross-sectional view, along lines 4—4 of FIG. 3, showing the connection between grille and flow regulator in the diffuser in FIGS. 1 and 2.
Figure 5:
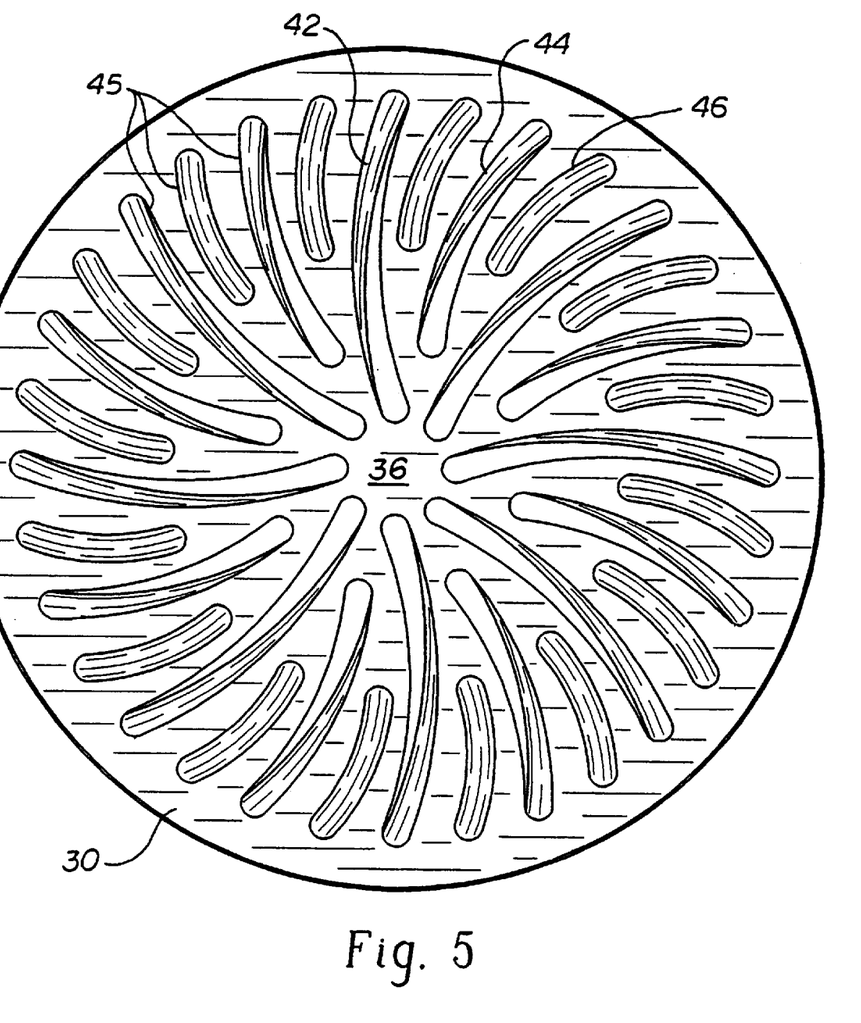
FIGS. 5 and 6 are top and bottom plan views of the grille.
Figure 15A:
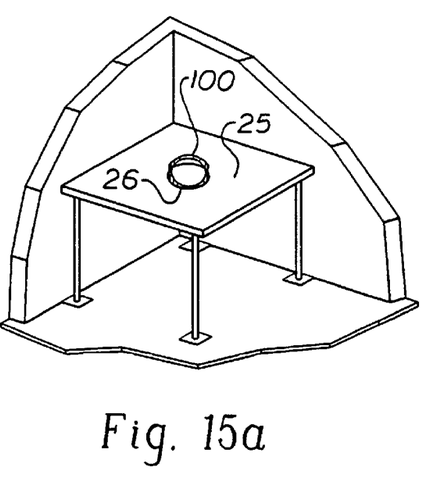
FIGS. 15a and 15b are schematic perspective views, showing the installation of the trim ring and retaining ring in the floor of an underfloor air distribution system.
Figure 15B:
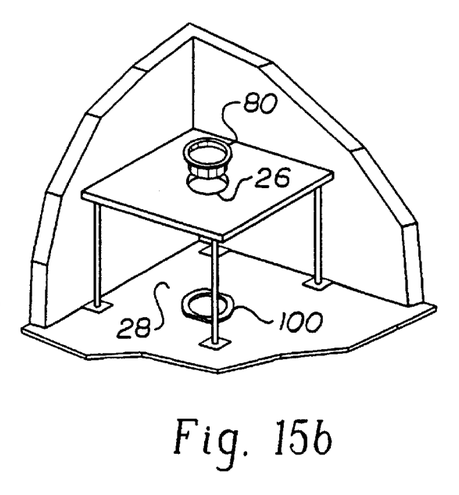
Figure 16:
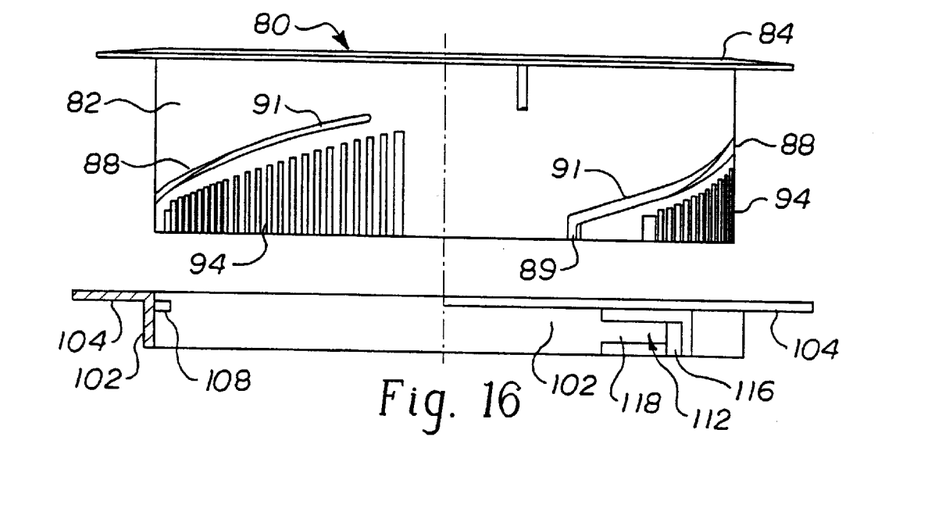
FIG. 16 is an exploded, partially sectioned side elevation view of the trim ring and retaining ring.
Figure 17:
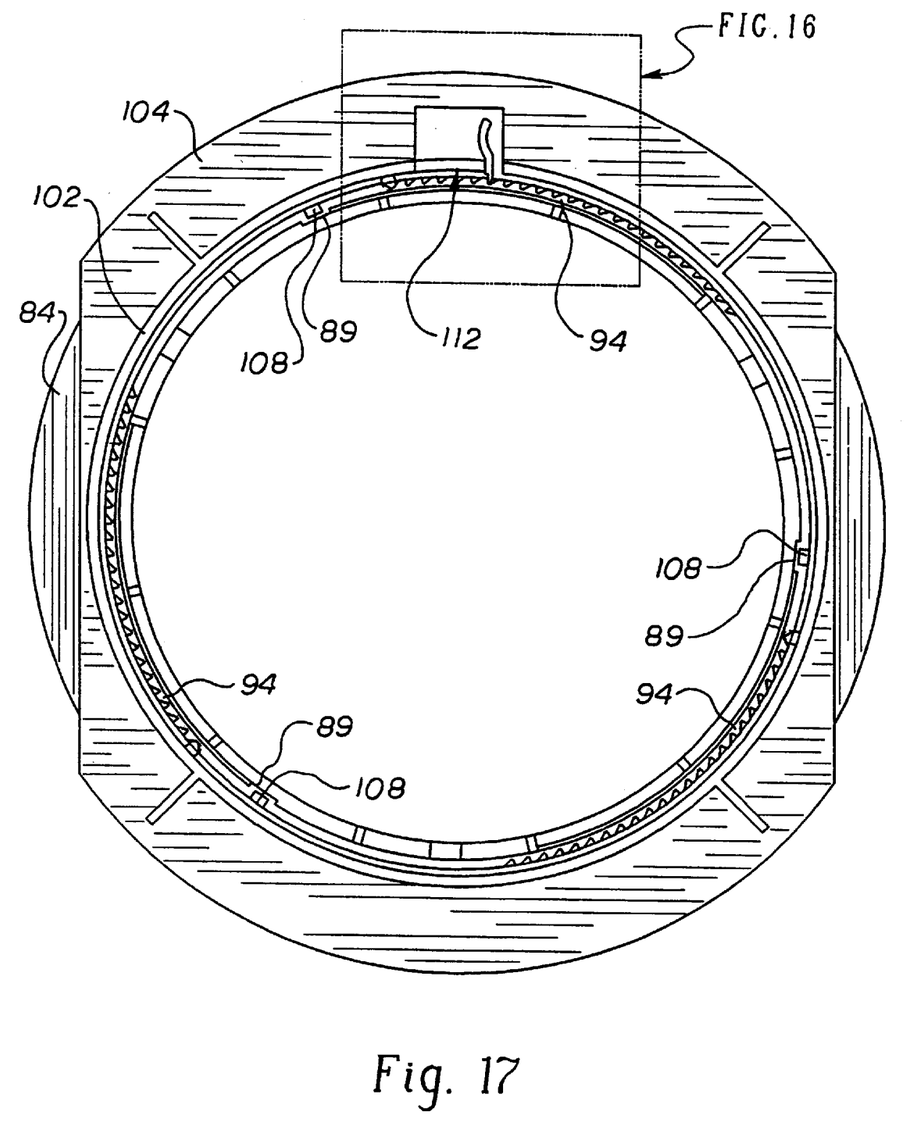
FIG. 17 is a bottom plan view of the trim ring and retainer ring.

The trim ring and retaining ring can be installed quickly and easily from above the floor, a marked advantage over the processes required with earlier underfloor diffusers. As shown in FIG. 15a, the retainer ring 100 is inserted through the hole 26 in floor 25 and allowed to rest on the bottom of the plenum 28. The trim ring 80 is then placed in hole 26, as shown in FIG. 17b. The installer reaches through the central opening in the trim ring, picks up the retainer ring, inserts the retaining ring pins 108 into the vertically extending mouths 89 of the trim ring camming grooves, and rotates the retaining ring to move pins 108 up the inclined spiral sections 91 of the camming grooves and pull the retaining ring up the trim ring until the floor is gripped securely between the trim ring flange 84 and the retaining ring flange 104. With the trim ring and retaining ring secured in place, housing 60 is placed inside the trim ring. As shown in FIGS. 2 and 4, the flange 67 at the top of housing 60 rests on an annular shoulder 86 that extends from the inside wall of trim ring 80. The flow regulator 70 is placed inside the housing, the grille 30 is placed on top, and the unit is ready for service. The entire installation process can be performed in less than one minute, which is substantially less than the time required for previous underfloor diffusers.

The diffuser can be removed just as easily. The grille, flow regulator and dust basket are removed. The worker then reaches through the central opening in the trim ring and grasps the release tab 116 on the retaining ring locking mechanism. As shown in FIG. 19, pulling back on the release tab flexes arm 118 and allows the latch tooth 114 to clear the teeth 94 on the trim ring 80 so that the retaining ring can be rotated back off the trim ring.

Figure 21:
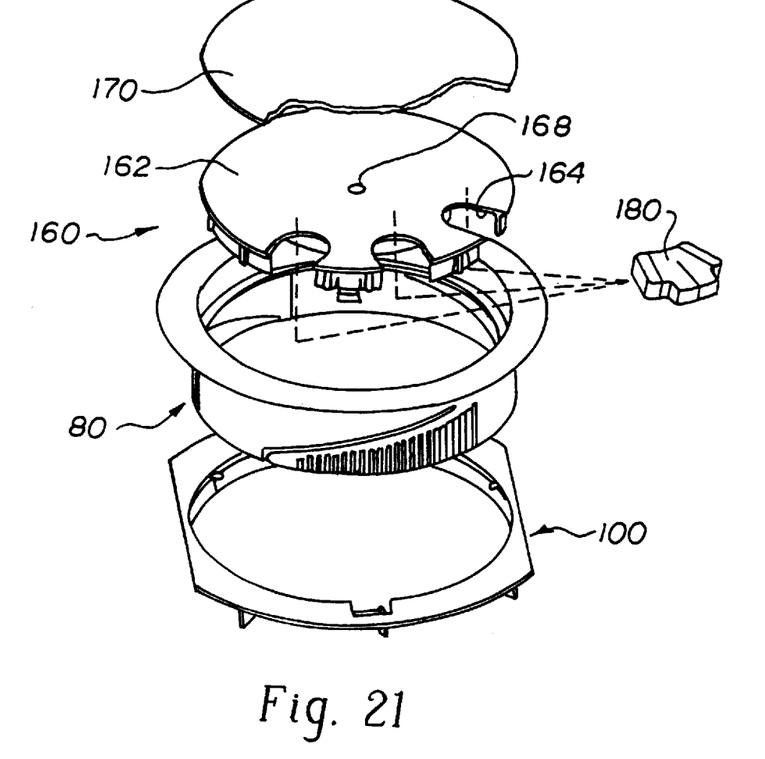
FIG. 21 is a perspective view of an electrical power/data port that may be used with the same mounting structure as the diffuser illustrated in foregoing Figures.
Figure 22:
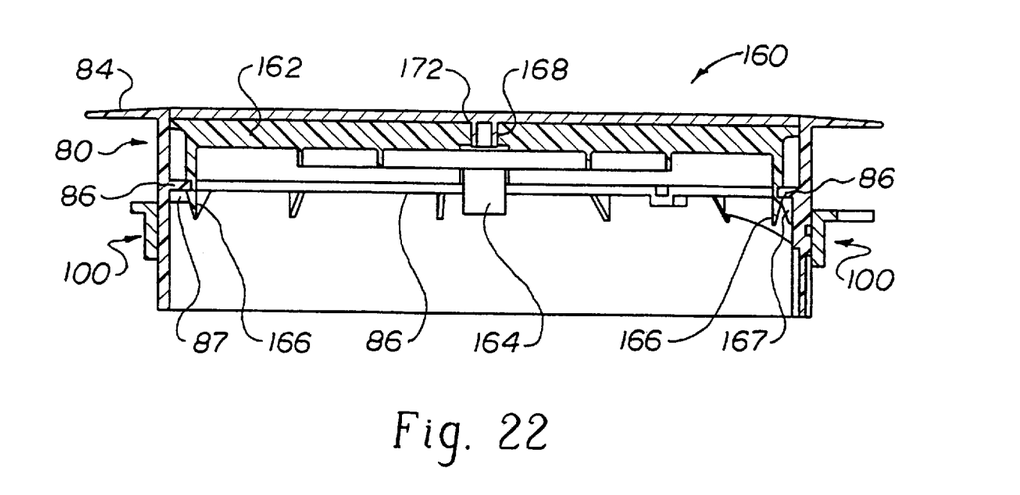
FIG. 22 is a cross-sectional elevation view of the power/data port in FIG. 21.

The illustrated air diffuser 20 can be rapidly converted to the electrical power/data port 160 shown in FIGS. 21 and 22 by simply removing the diffuser grille 30, flow regulator 70 and dust receptacle 60, and replacing them with them with the electrical power/data port cover 162, pivot cover 170 and, if desired, one or more of the electrical power/data port seals 180 shown in FIG. 19. This conversion to an electrical power/data port can be utilized when remodeling of an office space, or other changes, makes it desirable to use the opening 26 in the floor panel for electrical cables, fiber optic cables, or the like. As seen in FIG. 21, the electrical power/data port has several openings 164 that will accommodate many types and sizes of cables.

Electrical power/data port cover 160 has several locking tabs 166 with grooves 167 that snap on the annular shoulder 86 inside the trim ring 80. The locking tabs 166 are designed so that the electrical power/data port cover can be removed by inserting a tool into a central opening 168 in the electrical power/data port cover and pulling upward. The flexibility of the locking tabs allows them to snap off the shoulder in the locking ring.

When secured to shoulder 86, the electrical power/data port cover rests slightly beneath the top of the trim ring flange 84. Pivot cover 170, which has a central boss 172 that fits into the central opening 168 in the electrical power/data port cover, is then placed on top of the electrical power/data port cover and within the trim ring 80 so that the top of the pivot cover is substantially flush with the top surface of the trim ring. The pivot cover may be rotated about its center boss 172 to cover one or more of the openings of the electrical power/data port cover, depending on the number and area of openings required for cables. As shown in FIG. 19, optional adhesive backed grommet seals 180 may be used for small cabling to prevent or reduce the loss of air from the plenum.

It should be apparent that the air diffuser and electrical power/data port described above provide substantial advantages in furnishing, rearranging and updating modern offices and other commercial buildings with underfloor air and electrical distribution systems. These diffusers and electrical power/data port can be installed in a fraction of the time required for previous components, and can be moved, modified or switched just as readily to suit almost any conceivable configuration. The diffusers provide a superior air flow pattern and the helically slotted grilles can be molded more quickly and economically than prior art structures. As those skilled in the art will recognize, the diffusers, molds and molding processes described herein can be adapted to suit a wide variety of applications. Many adaptations, modifications may be made to the embodiments described above without departing from the spirit and scope of this invention, which is defined by the following claims.

We claim:

1. An air diffuser comprising a grille having a plurality of curved, helical air discharge slots with sloping sides that are substantially straight from the top of said slots to the bottom of said slots, said slots having a slope that varies as a function of radial distances from a center of said grille.

2. An air diffuser in accordance with claim 1 wherein said helical slots extend generally outward from a central hub of said grille and the slope of said slots increases as the distance from said hub increases.

3. An air diffuser in accordance with claim 2 wherein the ratio of the lateral offset from top to bottom of any slot at any first location along said slot to the lateral offset at any second location along the slot is substantially equal to the ratio of the radial distance from the center of said grille to said first location to the radial distance from said center to said second location.

4. The underfloor diffuser apparatus of claim 1 wherein said helical slots have a geometry wherein the proportion of the width of a base of a right triangle formed by a first arcuate section extending through a first point of a slot and the width of a base of a right triangle formed by a second arcuate section extending through a second point of a slot is substantially equal to the proportion of the distance from a center point of the grille to the first arcuate section and a distance from the center point of the grille to the second arcuate section.

5. An air diffuser grille comprising a disc having a plurality of curved, outwardly extending slots with sides that are substantially straight from the top of said slots to the bottom of said slots, said slots having sloping sides whose slope increases as the distance from the center of the grill increases to permit the grill to be simultaneously rotated and lifted off a mold core with solid core pins shaped to mold said slots.

6. An air diffuser in accordance with claim 5 wherein the ratio of the lateral offset from top to bottom of any slot at any first location along said slot to the lateral offset at any second location along the slot is substantially equal to the ratio of the radial distance from the center of said grille to said first location to the radial distance from said center to said second location.

7. An air diffuser according to claim 5 wherein the ratio of the width of the base of a right triangle formed by an arcuate section through one of said slots, wherein the side of said slot defines the hypotenuse of said triangle, to the width of the base of a second right triangle formed by another arcuate section through one of said slots at a different distance from the center of said grille is substantially equal to the ratio of the distance from the center of grille to said first right triangle to the distance to said second right triangle.

8. An underfloor air diffuser comprising a housing and a diffuser grille engaging said housing, said diffuser grille having a plurality of curved, helically oriented air slots extending through said grille from top to bottom, said slots having sloping sides that are substantially straight from the top of arcuate cross-sections through said grille to the bottom of said cross-sections and a slope that increases as the distance from a center of said grille increases.

9. An air diffuser in accordance with claim 8 wherein said helical slots extend generally outward from a central hub of said grille and the slope of said slots increases as the distance from said hub increases.

10. An air diffuser according to claim 9 wherein the ratio of the width of the base of a right triangle formed by an arcuate section through one of said slots, wherein the side of said slot defines the hypotenuse of said triangle, to the width of the base of a second right triangle formed by another arcuate section through one of said slots at a different distance from the center of said grille is substantially equal to the ratio of the distance from the center of grille to said first right triangle to the distance to said second right triangle.

11. An air diffuser comprising a grille having a plurality of curved, helical air discharge slots that extend generally outward from a central hub of said grille, said slots having sloping sides that are substantially straight from the top of arcuate cross-sections through said slots to the bottom of said arcuate cross-sections, and whose slope increases as the distance from said hub increases.

12. An air diffuser in accordance with claim 11 wherein the ratio of the lateral offset from top to bottom of any slot at any first location along said slot to the lateral offset at any second location along the slot is substantially equal to the ratio of the radial distance from the center of said grille to said first location to the radial distance from said center to said second location.

13. The underfloor diffuser apparatus of claim 11 wherein said helical air discharge slots have a geometry wherein the proportion of the width of a base of a right triangle formed by a first arcuate section extending through a first point of a slot and the width of a base of a right triangle formed by a second arcuate section extending through a second point of a slot is substantially equal to the proportion of the distance from a center point of the grille to the first arcuate section and a distance from the center point of the grille to the second arcuate section.

* * * * *